(12) United States Patent
Dakowski et al.

(10) Patent No.: US 9,004,852 B2
(45) Date of Patent: Apr. 14, 2015

(54) VENTILATION OF A HIGH-PRESSURE TURBINE IN A TURBOMACHINE

(75) Inventors: Mathieu Dakowski, Noiseau (FR); Fabrice Garin, Boissise la Bertrand (FR); Delphine Roussin-Leroux, Samois sur Seine (FR); Wilfried Schweblen, Chateaubleau (FR)

(73) Assignee: SNECMA, Paris (FR)

( * ) Notice: Subject to any disclaimer, the term of this patent is extended or adjusted under 35 U.S.C. 154(b) by 1004 days.

(21) Appl. No.: 13/125,154

(22) PCT Filed: Oct. 16, 2009

(86) PCT No.: PCT/FR2009/001214
§ 371 (c)(1),
(2), (4) Date: Aug. 4, 2011

(87) PCT Pub. No.: WO2010/046553
PCT Pub. Date: Apr. 29, 2010

(65) Prior Publication Data
US 2011/0280735 A1    Nov. 17, 2011

(30) Foreign Application Priority Data

Oct. 20, 2008  (FR) ..................... 08 05795

(51) Int. Cl.
  F01D 5/08   (2006.01)
  F02C 7/18   (2006.01)
(52) U.S. Cl.
  CPC ............... *F01D 5/082* (2013.01); *F01D 5/087* (2013.01); *F02C 7/18* (2013.01); *Y02T 50/671* (2013.01); *Y02T 50/676* (2013.01); *F05D 2260/205* (2013.01)

(58) Field of Classification Search
None
See application file for complete search history.

(56) References Cited

U.S. PATENT DOCUMENTS

| 3,647,313 | A | * | 3/1972 | Koff .............................. 415/115 |
| 5,340,274 | A | * | 8/1994 | Cunha ........................... 415/115 |
| 6,361,277 | B1 | * | 3/2002 | Bulman et al. ............... 416/96 R |
| 6,981,841 | B2 | * | 1/2006 | Krammer et al. ............. 415/115 |
| 2004/0042900 | A1 | | 3/2004 | Dougherty et al. |
| 2007/0258813 | A1 | | 11/2007 | Klutz |

(Continued)

FOREIGN PATENT DOCUMENTS

| DE | 10 2004 042295 | 3/2006 |
| EP | 1 394 358 | 3/2004 |

(Continued)

OTHER PUBLICATIONS

International Search Report issued Jan. 20, 2010 in PCT/FR09/001214 filed Oct. 16, 2009.

(Continued)

*Primary Examiner* — Nathaniel Wiehe
*Assistant Examiner* — Jeffrey A Brownson
(74) *Attorney, Agent, or Firm* — Oblon, McClelland, Maier & Neustadt, L.L.P.

(57) ABSTRACT

A turbomachine high-pressure turbine including a rotor disc with upstream and downstream annular flanges separating a radially internal annular cavity in which the hub of the disc extends from two radially external annular cavities, of which one is upstream of the disc and receives a ventilation air flow and of which the other is downstream of the disc, the upstream flange of the disc including a mechanism connecting to the upstream eternal cavity and the internal cavity for ventilating the hub of the disc.

11 Claims, 2 Drawing Sheets

(56) References Cited

U.S. PATENT DOCUMENTS

| | | |
|---|---|---|
| 2008/0145208 A1 | 6/2008 | Klasing et al. |
| 2008/0310950 A1 | 12/2008 | Young et al. |

FOREIGN PATENT DOCUMENTS

| | | |
|---|---|---|
| EP | 1 911 937 | 4/2008 |
| EP | 1 939 397 | 7/2008 |
| FR | 2 907 496 | 4/2008 |

OTHER PUBLICATIONS

U.S. Appl. No. 13/059,350, filed May 11, 2011, Dakowski et al.

* cited by examiner

VENTILATION OF A HIGH-PRESSURE TURBINE IN A TURBOMACHINE

BACKGROUND OF THE INVENTION

1. Field of the Invention

The present invention relates to ventilating a high pressure turbine in a two-spool turbomachine such as an airplane turbojet, and it relates more particularly to ventilating a high pressure turbine disk.

2. Description of the Related Art

Two-spool turbomachines have a high pressure turbine arranged at the outlet from a combustion chamber in order to extract energy from a stream of gas ejected by the combustion chamber and impart rotary drive to a high pressure compressor located upstream from the combustion chamber in order to feed said chamber with air under pressure. Such turbomachines also include a low pressure turbine arranged downstream from the high pressure turbine in order to extract additional energy from the gas stream and impart rotary drive to a low pressure compressor that is arranged upstream from the high pressure compressor.

The high pressure turbine generally comprises a disk located at the outlet from the combustion chamber and carrying blades that are driven in rotation by the stream of gas ejected by said combustion chamber, the disk being surrounded by a stator element such as a sectorized ring in order to seal the flow section for gas through the turbine.

Because of the high temperatures reached by the combustion gas, the stator sealing ring and the rotor disk are subjected to high levels of thermal stress of a kind that causes these components to expand.

The disk presents relatively high mass and therefore responds more slowly than the sealing ring to variations in the temperature of the gas, which variations of temperature are caused by variations in the operating speed of the turbomachine, thereby giving rise to differential thermal expansion, particularly since the disk is less exposed to the combustion gas than are the blades that it carries and the sealing ring of the stator.

Such differential thermal expansion gives rise to variations in the clearance at the tips of the blades during various operating stages of the turbomachine, thus making it necessary to provide relatively large amounts of clearance, to the detriment of turbine performance.

Furthermore, temperature within the disk is not uniform, in particular between its radially outer periphery carrying the blades, which are in contact with the combustion gas, and its hub, which is spaced apart from the combustion gas.

Temperature gradients in the disk shorten its lifetime and make it necessary to use a disk that is relatively thick and massive, which goes against the attempts at achieving weight savings that are inherent to designing such turbomachines.

In order to limit those drawbacks, the disk is generally ventilated by air bled from upstream in order to heat it when speeds are increasing so as to accelerate its thermal expansion, and in order to cool it when speeds are decreasing so as to accelerate its contraction.

The blades of the disk generally benefit from a dedicated ventilation circuit that bleeds air from the combustion chamber end in order to convey said air via injectors into an annular cavity formed immediately upstream from the disk and communicating with ventilation circuits formed inside the blades.

The hub of the disk receives ventilation air that is generally bled from a stage of the high pressure compressor, and that flows downstream, e.g. along a cylindrical shroud or sheath that extends axially from the above-mentioned stage of the compressor and that defines an annular cavity that is radially inside the above-mentioned cavity extending downstream as far as the disk of the high pressure turbine.

Nevertheless, air taken from the high pressure compressor for ventilating the hub of the disk does not have the same temperature as the air that is bled from the combustion chamber end in order to ventilate the blades of said disk, and it follows a path that is considerably longer. During a change of speed, the air for ventilating the hub of the disk thus experiences temperature changes with a delay relative to the air for ventilating the blades and relative to the combustion gas.

This makes it difficult to control the clearance at the blade tips and makes it necessary to provide relatively large amounts of clearance of a kind that penalizes performance of the turbine, in order to limit the risk of premature wear of the blades and of the sealing ring surrounding them.

Furthermore, this is harmful to achieving a satisfactory reduction of temperature gradients in the disk of the turbine.

In addition, the air bled from the combustion chamber end for ventilating the blades of the high pressure turbine is at a pressure that is higher than the pressure of the air bled from the high pressure compressor for ventilating the hub of the disk of said turbine.

The blade ventilation air passes via the annular cavity connected to the internal ventilation circuits of the blades, and it therefore applies pressure to a radially outer portion of the upstream flank of the disk, while the hub ventilation air flows through the radially inner cavity on both sides of the hub of the disk.

This gives rise to the disk being subjected to unbalanced pressures, thereby inducing downstream axial thrust on the disk and making the turbomachine more difficult to control.

BRIEF SUMMARY OF THE INVENTION

A particular object of the invention is to provide a solution to those problems that is simple, inexpensive, and effective, and that enables the drawbacks of the prior art to be avoided.

A particular object of the invention is to decrease the temperature gradients in the rotor disk of the high pressure turbine, and to reduce the temperature response time of said disk.

Another object is to balance the pressures applied on either side of the disk so as to limit the axial forces applied to the disk.

To this end, the invention provides a high pressure turbine for a turbomachine, the turbine comprising at least one bladed rotor disk having upstream and downstream annular flanges separating a radially inner annular cavity containing the hub of the disk from two radially outer annular cavities, one of which cavities is upstream from the disk and receives a stream of air for ventilating the blades of the disk and coming from a combustion chamber end, and the other of which cavities is downstream from the disk, the turbine being characterized in that the upstream flange of the disk includes means putting the upstream radially outer cavity into communication with the radially inner cavity for ventilating the hub of the disk.

As a result, the hub of the high pressure turbine disk is no longer ventilated by air bled from a stage of the high pressure compressor of the turbine, but is ventilated by a fraction of the air bled from the combustion chamber end and injected into the radially outer cavity situated upstream from the disk, while the remaining fraction of said air is used for ventilating the blades carried by the disk.

Consequently, the air for ventilating the hub of the disk follows a path that is relatively short, like the air for ventilating the blades, such that its temperature follows variations in the operating speed of the turbomachine with practically no delay.

This makes it possible to reduce differential thermal expansion between the rotor of the high pressure turbine and the sealing ring that surrounds said rotor, such that the clearance at the blade tips can be made smaller when dimensioning the turbine without any risk of premature wear of the blades and of the sealing ring.

The invention also makes it possible to reduce temperature gradients within the disk of the high pressure turbine, thereby increasing the lifetime of said disk and making it possible to use a disk of relatively small thickness and thereby reduce the weight of the turbomachine, which is particularly advantageous for an airplane turbojet. The use of a smaller-thickness disk also serves to improve the temperature response time of the disk and to limit even better the above-mentioned differential thermal expansion.

Furthermore, the air for ventilating the hub of the disk has the same pressure as the air for ventilating the blades of the disk, such that the same pressure is applied by ventilation air to the disk both upstream and downstream, thereby enabling the axial thrust of the ventilation air on the disk to be reduced. This presents advantages, in particular for dimensioning the rolling bearings supporting the rotor of the high pressure turbine.

In a preferred embodiment of the invention, the means putting the upstream radially outer cavity into communication with the radially inner cavity comprise radial grooves formed in the upstream face of the upstream flange of the disk, these grooves forming air flow channels between the upstream flange and a rotary component of the turbomachine to which said flange is connected.

The grooves in the upstream flange, sometimes referred to as crescents, serve to pass air from the radially outer cavity into the radially inner cavity without harming the mechanical strength of the flange.

Advantageously, the downstream flange of the disk includes means putting the radially inner cavity into communication with the downstream radially outer cavity, these means preferably comprising radial grooves formed in the downstream face of the downstream flange of the disk. These grooves form air flow channels between the downstream flange and a rotary component of the turbomachine to which said flange is connected.

Putting the downstream radially outer cavity into communication with the radially inner cavity enables the pressure of the ventilation air for the disk hub to be applied to all of the downstream flank of said disk, thereby reducing the axial thrust applied to the disk as well as possible.

The grooves in the downstream flange achieve the same advantage in terms of mechanical properties as the grooves in the upstream flange.

According to another characteristic of the invention, the radially inner cavity is defined radially inwards by a cylindrical shroud or sheath having its upstream end fastened to the component carrying the upstream flange of the disk, and having its downstream end fastened to the component carrying the downstream flange of the disk.

The sheath serves to close the radially inner cavity in leaktight manner and it presents the advantage of being considerably shorter than the prior art sheath, since it is fastened upstream and downstream from the disk of the high pressure turbine at short distances therefrom. This shortening of the sheath serves not only to achieve a saving in weight, but also to reduce any risk of vibratory coincidences with bending modes of the sheath.

In a preferred embodiment of the invention, the sheath co-operates with the shaft of a low pressure turbine of the turbomachine to define an annular passage for delivering ventilation air bled from a stage of a high pressure compressor of the turbomachine.

By way of example, this ventilation air may be used for ventilating rotor elements of the low pressure turbine, downstream from the high pressure turbine.

By way of example, the component carrying the upstream flange of the disk is a rotor disk carrying labyrinth seals and including orifices that are formed to extend injectors fastened to an inner wall of the combustion chamber so as to pass the stream of air bled from the combustion chamber end.

By way of example, the component carrying the downstream flange of the disk is a drive cone of the rotor.

The invention also provides a turbomachine including a high pressure turbine of the type described above.

BRIEF DESCRIPTION OF THE SEVERAL VIEWS OF THE DRAWINGS

The invention can be well understood and other details, advantages, and characteristics thereof appear more clearly on reading the following description made by way of non-limiting example and with reference to the accompanying drawings, in which.

DETAILED DESCRIPTION OF THE INVENTION

Figure 1:
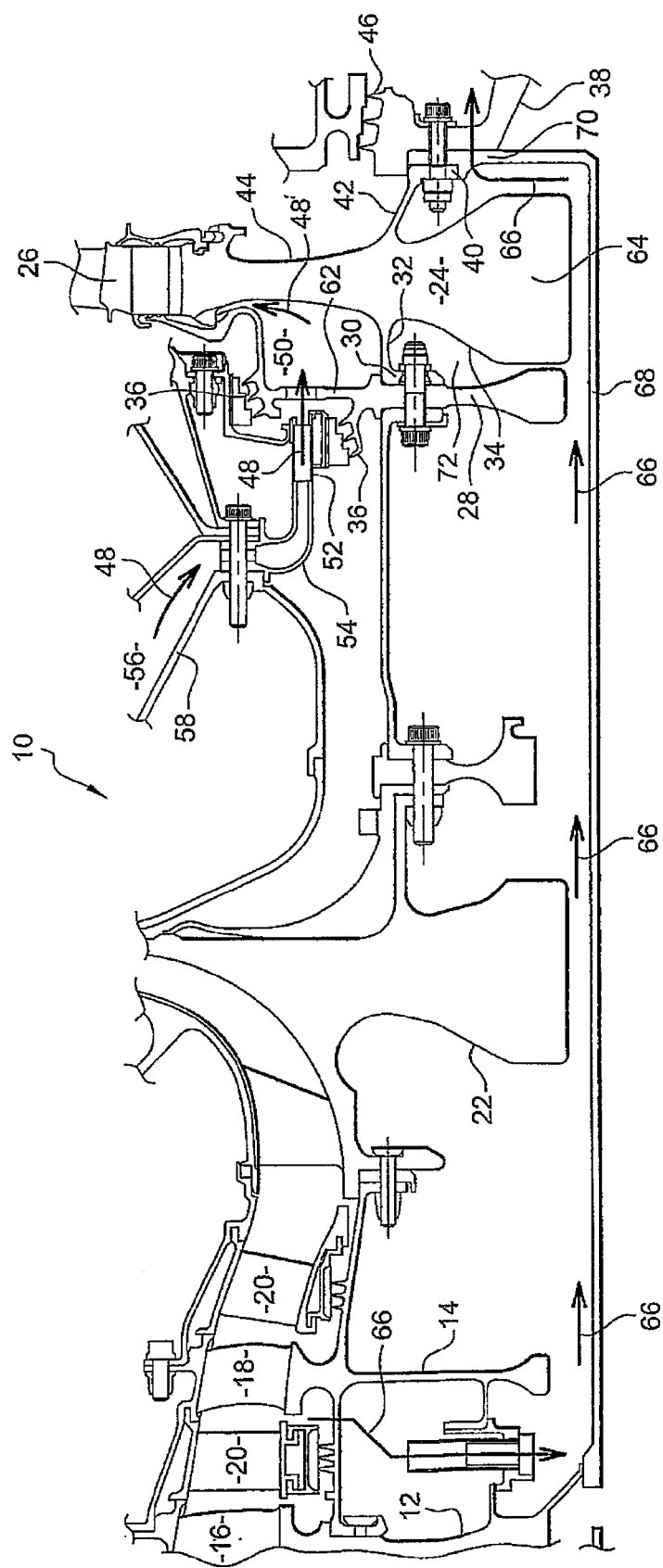
FIG. 1 is a fragmentary diagrammatic view in axial section of a turbomachine including a prior art high pressure turbine.

FIG. 1 shows a two-spool airplane turbojet 10 of known type comprising in particular, from upstream to downstream; a high pressure compressor, a combustion chamber, and a high pressure turbine.

The high pressure compressor comprises a rotor made up of disks 12, 14 carrying blades 16, 18 with stator stages 20 interposed between them for guiding the stream of air through the compressor. At its outlet, the high pressure compressor has a centrifugal impeller 22 for delivering air under pressure to the combustion chamber.

The high pressure turbine essentially comprises a rotor disk 24 carrying blades 26 that extend in the flow section for the combustion gas ejected by the combustion chamber for the purpose of extracting mechanical energy from that gas stream so as to impart rotary drive to the rotor of the high pressure turbine and of the high pressure compressor in known manner. The blades 26 of the disk 24 are surrounded by a sectorized sealing ring (not visible in the figure) that is fastened to a high pressure turbine casing and that serves to seal the flow section for the combustion gas through said turbine.

The disk 24 of the high pressure turbine is connected to a rotary disk 28 located upstream from the disk 24 by means of an annular flange 30 that extends radially from the upstream end of a cylindrical wall 32 that extends upstream from the upstream flank 34 of the disk 24 of the high pressure turbine. The disk 28 carries wipers 36 of a labyrinth seal and it is connected to the rotor of the high pressure compressor.

The disk 24 of the high pressure turbine is also connected to a drive cone 38 located downstream from the disk 24 by means of an annular flange 40 extending radially at the downstream end of a cylindrical wall 42 that extends downstream from the downstream flank 44 of the disk 24 of the high pressure turbine. The drive cone 38 also carries wipers 46 of labyrinth seals.

In operation, the blades 26 of the disk 24 of the high pressure turbine and the sealing ring surrounding these blades are subjected to high levels of thermal stress because of the passage of very hot combustion gas through the turbine.

In order to limit the negative impact of such thermal stresses on the lifetime of the blades 26, the blades include internal circuits of ducts conveying ventilation air that is bled from the end of the combustion chamber and that is at a temperature that is lower than the temperature of the combustion gas.

This air, represented by arrow 48, is taken to an annular cavity 50 by injectors 52 that are angularly distributed around the axis of the turbojet and that are mounted at the downstream end of bent pipes 54 connected to a tubular space 56 that passes around the combustion chamber and that is defined by a radially inner frustoconical wall 58 of said chamber. The ventilation air 48 leaving the injectors enters into the cavity 50 via orifices 62 formed in the disk 28.

The cavity 50 is defined by the disk 28, the cylindrical wall 32 carrying the upstream flange 30, and by the upstream flank 34 of the disk 24, and this cavity 50 communicates with the ventilation circuits provided inside the blades 26 and opening out into said cavity via the blade roots. The ventilation air 48 flows through the cavity 50 radially outwards along the upstream flank 34 of the disk until its reaches the inlet orifices of the ventilation circuits of the blade 26.

In operation, the high temperature of the combustion gas causes the blades 26 to expand thermally together with the sealing ring that surrounds them, and it also causes the disk 24 carrying the blades to expand.

This temperature varies as a function of the running speed of the turbojet, such that the above-mentioned elements expand and contract in turn when the running speed increases and decreases.

The hub 64 of the disk is ventilated by air 66 bled from the high pressure compressor of the turbojet, e.g. between rotor disks 12 and 14, and it is guided downstream along a cylindrical shroud or sheath 68 having its upstream end connected to the disk 12 of the high pressure compressor and having its downstream end connected by a flange 70 to the drive cone 38. The air 66 passes through the bore in the disk 24 and around its hub 64, flowing into a radially inner cavity 72 defined in particular by the sheath 68 and by the upstream and downstream cylindrical walls 32 and 42 of the disk 24, and this ventilation air 66 then escapes downstream via orifices formed in the flange 70 of the sheath and in the drive cone 38.

The ventilation air 66 serves to keep the disk 24 at a temperature level for limiting the temperature gradient within said disk.

In addition, during an increase in the operating speed of the turbojet, the temperature of the air 66 increases, thereby heating the disk 24 and thus accelerating its thermal expansion and limiting any increase in the clearance at the tips of the blades 26 of the high pressure turbine, in spite of the faster expansion of the sealing ring surrounding the blades.

During a decrease in speed, the temperature of the air 66 decreases such that said air cools the disk and accelerates its thermal contraction, thus serving to reduce any risk of friction between the tips of the blades 26 and the sealing ring that contracts more quickly.

Nevertheless, the temperature of the air 66 bled from the high pressure compressor is different from the temperature of the air 48 bled from the end of the combustion chamber, and it responds to changes in the operating speed of the turbojet with a perceptible delay, thus limiting the effectiveness of this technique for ventilating the hub of the disk 24.

In addition, the ventilation air 48 bled from the end of the combustion chamber is at a pressure higher than the pressure of the ventilation air 66 taken from the high pressure compressor, and it applies this pressure to a radially outer portion of the upstream flank 34 of the disk 24, while the lower pressure of the ventilation air 66 is applied to both sides of the hub 64 of the disk. As a result there is an axial force acting downstream on the disk 24, thereby making it more difficult to control the turbojet.

In order to solve these problems, the invention proposes modifying the means for ventilating the disk 24 of the high pressure turbine, and more precisely it proposes using a fraction of the ventilation air 48 bled from the end of the combustion chamber to ventilate the hub 64 of the disk 24.

Figure 2:
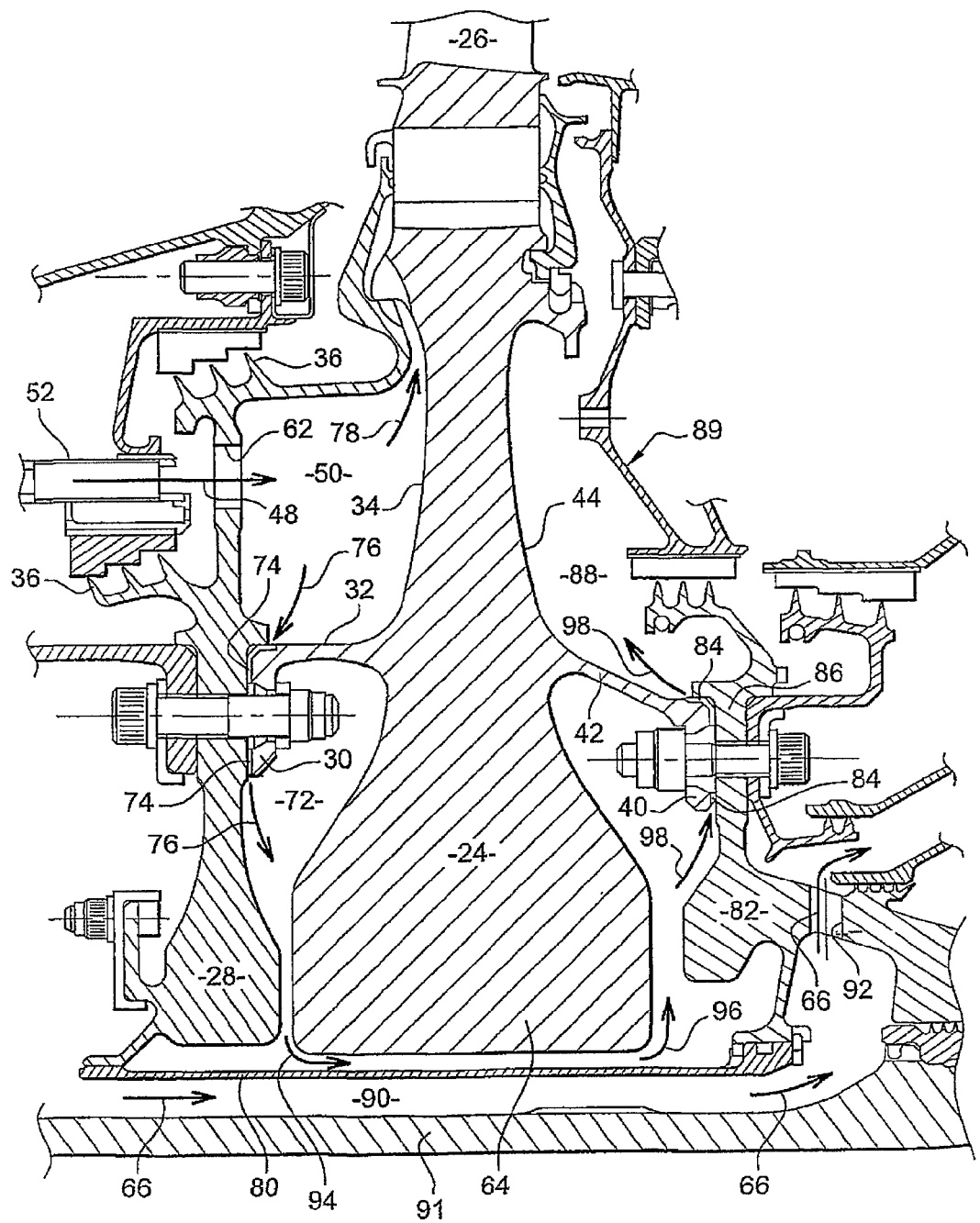
FIG. 2 is a fragmentary diagrammatic view in axial section on a larger scale of a turbomachine including a high pressure turbine of the invention.

FIG. 2 shows a portion of a turbojet 10 in accordance with the invention, and more particularly the disk 24 of the high pressure turbine of said turbojet, together with its immediate surroundings.

In the invention, the upstream flange 30 of the disk 24 includes radial grooves 74 formed in its upstream face pressed against the downstream flank of the disk 28 so as to form channels that put the annular cavity 50 situated radially on the outside of the upstream cylindrical wall 32 into communication with the annular cavity 72 situated radially on the inside of said wall 32.

These grooves 74, sometimes referred to as crescents, enable a fraction 76 of the ventilation air 48 to penetrate into the radially inner cavity 72 in which the hub 64 of the disk 24 extends so as to ventilate the hub, while the remainder 78 of the ventilation air 48 continues to feed the internal circuits in the blades 26.

The radially inner cavity 72 is defined by a cylindrical sheath 80 having its upstream end fastened to the disk 28 and its downstream end fastened to the drive cone 82 that is mounted downstream from the disk 24 of the turbine. This sheath thus presents the advantage of an axial extent that is considerably shorter than that of the above-described prior art sheath 68.

Furthermore, grooves 84 analogous to the grooves 74 are formed in the downstream face of the downstream flange 40 that is pressed against an upstream radial wall 86 of the drive cone 82 in order to form channels for putting the radially inner cavity 72 into communication with a downstream annular cavity 88 that is situated radially outside the cylindrical wall 42 carrying the downstream flange 40 and that is defined by the downstream flank 44 of the disk 24 and by stator elements 89.

Ventilation air 66 continues to be bled from the high pressure compressor as in the above-described prior art, but this air no longer passes into the radially inner cavity 72 and it is guided via an annular passage 90 defined by the sheath 80 and a shaft 91 of the rotor of a low pressure turbine arranged downstream from the high pressure turbine. This air 66 flows downstream, passing via orifices 92 in the drive cone 82 and serves to ventilate elements of the low pressure turbine, such as rotor disks. Thus, unlike the prior art drive cone 38, the drive cone 82 does not have orifices opening out into the radially inner cavity 72.

In operation, a fraction 78 of the ventilation air 48 bled from the end of the combustion chamber serves to ventilate the blade 26, while another fraction 76 of this air passes via the channels formed by the grooves 74 in the upstream flange 30 to reach the radially inner cavity 72. The air 76 thus serves to ventilate the disk 24 of the high pressure turbine, and in particular its hub 64, by flowing from upstream to downstream through the cavity 72 in such a manner as to flow past the hub 64, as represented by arrows 94 and 96. The air for ventilating the disk 24 then passes via the channels formed by the grooves 84 in the downstream flange 40 until it penetrates into the downstream radially outer cavity 88, as represented by arrows 98, thereby ventilating the downstream flank 44 of the disk 24.

The air 76 for ventilation the disk 24 is thus at the same temperature as the air 78 for ventilating the blades 26. This temperature is lower than the temperature of the combustion gas ejected from the combustion chamber, such that the air 78 continuously cools the blades, and this temperature varies as a function of the operating speed of the turbojet such that the air 76 heats the disk 24 during a rise in speed and cools the disk 24 during a drop in speed.

The temperature of the ventilation air 76 bled from the end of the combustion chamber responds more quickly to variations in the speed of the turbojet than does the temperature of the ventilation air 66 bled from the high pressure compressor.

This gives rise to better synchronization between the thermal expansion of the sealing ring of the high pressure turbine stator and the thermal expansion of the rotor of said turbine, thereby achieving better control over the clearance at the tips of the blades 26 carried by the disk 24.

This also gives rise to more uniform temperature in the disk 24 thereby improving the lifetime of the disk, and makes it possible, when dimensioning the high pressure turbine, to use a disk that is thinner than in the prior art, thereby achieving a weight saving and further improving the temperature response time of the disk.

Furthermore, the fact that the air 76 flows in the three annular cavities, respectively the radially outer cavities 50 and 88, and the radially cavity 72, ensures that the same pressure is applied to the upstream and downstream flanks 34 and 44 of the disk 24, such that the axial thrust exerted on the disk by the ventilation air is substantially zero, thereby making the turbojet easier to control.

Finally, the fact that the sheath 80 is shorter than the prior art sheath 68 also achieves a weight saving and reduces the risk of vibration coinciding with the bending modes of the sheath.

In the example shown in FIG. 2 as described above, the means for putting the radially outer cavities 50 and 88 into communication with the radially inner cavity 72 are channels formed by radial grooves formed in the flanges 30 and 40. Such grooves serve to put the above-mentioned cavities into communication, while preserving the stiffness of the cylindrical walls 32 and 42 carrying the flanges 30 and 40.

In a variant, or in addition, it is possible to provide orifices through these cylindrical walls 32 and 42 for passing ventilation air into the various cavities.

The invention claimed is:

1. A high pressure turbine for a turbomachine, the turbine comprising:
at least one bladed rotor disk including upstream and downstream annular flanges separating a radially inner annular cavity containing a hub of the disk from a first radially outer annular cavity and a second radially outer annular cavity, the first radially outer annular cavity being upstream from the disk, and the second radially outer annular cavity being downstream from the disk; and
fluid injectors for providing from upstream a stream of air to the first radially outer annular cavity, the stream of air coming from a combustion chamber end, wherein:
the radially inner annular cavity has a first portion extending upstream of said at least one bladed rotor disk, and a second portion extending downstream of said at least one bladed rotor disk,
the upstream flange of the disk includes means for passing said stream of air from the first radially outer annular cavity to the first portion of the radially inner annular cavity,
the radially inner annular cavity is delimited radially inwards by a cylindrical shroud or sheath having an upstream end fastened to a first component carrying the upstream flange of the disk, and having a downstream end fastened to a second component carrying the downstream flange of the disk, so that said stream of air passes from the first portion to the second portion of the radially inner annular cavity, and
the downstream flange of the disk includes means for passing said stream of air from the second portion of the radially inner annular cavity to the second radially outer annular cavity.

2. A high pressure turbine according to claim 1, wherein the means for passing said stream of air from the first radially outer annular cavity to the first portion of the radially inner annular cavity comprises radial grooves formed in an upstream face of the upstream flange of the disk, the grooves forming air flow channels between the upstream flange and the first component of the turbomachine to which the upstream flange is connected.

3. A high pressure turbine according to claim 1, wherein the means for passing said stream of air from the second portion of the radially inner annular cavity to the second radially outer annular cavity comprises radial grooves formed in a downstream face of the downstream flange of the disk, the grooves forming air flow channels between the downstream flange and the second component of the turbomachine to which the downstream flange is connected.

4. A high pressure turbine according to claim 1, wherein the sheath co-operates with a shaft of a low pressure turbine of the turbomachine to define an annular passage for delivering ventilation air bled from a stage of a high pressure compressor of the turbomachine.

5. A high pressure turbine according to claim 1, wherein the first component carrying the upstream flange of the disk is a rotor disk carrying labyrinth seals and including orifices for passing a stream of air bled from the combustion chamber end.

6. A high pressure turbine according to claim 5, wherein the orifices of the disk carrying the labyrinth seals are formed in line with injectors fastened to an inside wall of the combustion chamber end.

7. A turbine according to claim 1, wherein the second component carrying the downstream flange of the disk is a drive cone of the rotor.

8. A turbomachine, comprising a high pressure turbine according to claim 1.

9. A high pressure turbine according to claim 1, wherein the radially inner annular cavity includes a third portion which fluidly connects the first and second portions of the radially inner annular cavity, the third portion of the radially inner annular cavity being delimited by an inner circumferential surface of the hub of the disk and an outer circumferential surface of the sheath.

10. A high pressure turbine for a turbomachine, the turbine comprising:
at least one bladed rotor disk including upstream and downstream annular flanges separating a radially inner annular cavity containing a hub of the disk from a first radially outer cavity and a second radially outer annular cavity, the first radially outer annular cavity being upstream from the disk, and the second radially outer annular cavity being downstream from the disk, the radially inner annular cavity having a first portion extending upstream of said at least one bladed rotor disk and a second portion extending downstream of said at least one bladed rotor disk; and fluid injectors for providing from a combustion chamber end, where air temperature is lower than that of combustion gas issued from said combustion chamber, a stream of air to the first radially outer annular cavity, wherein the upstream flange of the disk includes means for passing said stream of air from the first radially outer annular cavity to the first portion of the radially inner annular cavity, and the downstream flange of the disk includes means for passing said stream of air from the second portion of the radially inner annular cavity to the second radially outer annular cavity, wherein the radially inner annular cavity is delimited radially inwards by a cylindrical shroud or sheath having an upstream end fastened to a first component carrying the upstream flange of the disk, and having a downstream end fastened to a second component carrying the downstream flange of the disk, so that said stream of air passes from the first portion to the second portion of the radially inner annular cavity.

11. A high pressure turbine according to claim 10, wherein the radially inner annular cavity includes a third portion which fluidly connects the first and second portions of the radially inner annular cavity, the third portion of the radially inner annular cavity being delimited by an inner circumferential surface of the hub of the disk and an outer circumferential surface of the sheath.

* * * * *